United States Patent [19]

Yamada

[11] Patent Number: 4,912,712
[45] Date of Patent: Mar. 27, 1990

[54] FAULT DETECTION CIRCUIT CAPABLE OF DETECTING BURST ERRORS IN AN LRU MEMORY

[75] Inventor: Ikuo Yamada, Tokyo, Japan

[73] Assignee: NEC Corporation, Tokyo, Japan

[21] Appl. No.: 181,582

[22] Filed: Apr. 14, 1988

[30] Foreign Application Priority Data

Apr. 15, 1987 [JP] Japan .................................. 62-91039

[51] Int. Cl.$^4$ ............................................. G06F 11/10
[52] U.S. Cl. .................................................. 371/57.2
[58] Field of Search ... 364/200 MS File, 900 MS File; 371/57, 57.1, 57.2

[56] References Cited

U.S. PATENT DOCUMENTS

| 4,322,795 | 3/1982 | Lange et al. | 364/200 |
| 4,334,289 | 6/1982 | Lange et al. | 364/200 |
| 4,463,424 | 7/1984 | Mattson et al. | 364/300 |
| 4,761,733 | 8/1988 | McCrocklin et al. | 364/200 |

*Primary Examiner*—Charles E. Atkinson
*Attorney, Agent, or Firm*—Foley & Lardner, Schwartz, Jeffery, Schwaab, Mack, Blumenthal & Evans

[57] ABSTRACT

A fault detection circuit comprises an LRU memory having a series of bit storage cells for storing data bits therein, the stored bits indicating relationships between most recently referenced timings for each of address levels. Updating input data bits are generated by an LRU updated logic in response to the LRU memory being accessed from an external source and applying the generated updating input data bits to the LRU memory to cause same to generate updated output data bits. One of the updating input data bits is inverted prior to application to the LRU memory. An error detection circuit is responsive to the updated output data bits for detecting an error therein. One of the updated output data bits corresponding in binary significant position to the inverted updating input data bit is inverted prior to application to the error detection circuit. The inversion processes at the input and output of the LRU memory allow error-free data bits to be unaffected and the inversion process at the output of the memory causes a string of all zero's or all one's therein to be converted to a pattern which can be detected as an illegal by the error detection circuit.

2 Claims, 2 Drawing Sheets

FAULT DETECTION CIRCUIT CAPABLE OF DETECTING BURST ERRORS IN AN LRU MEMORY

BACKGROUND OF THE INVENTION

The present invention relates to a fault detection circuit for an LRU (least recently used) memory.

Least recently used memory is an algorithm for determining which page or segment of main memory is to be overwritten based on the length of time since the last access to that memory. A fault detection circuit for such a memory is known. However, one disadvantage of the prior art fault detection circuit is that it has no capability for detecting data bit errors caused by bursty dropouts. One solution to this problem would be to employ parity bit error detection techniques. However, the addition of such parity bits would result in an increase in the amount of hardware and lengthening of the cycle time of the LRU memory.

SUMMARY OF THE INVENTION

It is therefore an object of the present invention to provide a fault detection circuit capable of detecting data bit errors caused by burst errors.

The fault detection circuit of the invention comprises an LRU memory having a series of bit storage cells for storing data bits which indicate relationships between most recently referenced timings for each of the address levels. Updating input data bits are generated by an LRU update logic in response to the LRU memory being accessed from an external source and applying the generated updating input data bits to the LRU memory to cause same to generate updated output data bits. One of the updating input data bits is inverted prior to application to the LRU memory. An error detection circuit is responsive to the updated output data bits for detecting an error therein. One of the updated output data bits corresponding in binary significant position to the inverted updating input data bit is inverted prior to application to the error detection circuit. The inversion processes being effected at the input and output of the LRU memory, error-free data bits are unaffected. The inversion process at the output of the memory causes a string of all zero's or all one's in the LRU memory to be converted to a pattern which can be detected as illegal by the error detection circuit.

BRIEF DESCRIPTION OF THE DRAWINGS

The present invention will be described in further detail with reference to the accompanying drawings, in which.

DETAILED DESCRIPTION

Figure 1:
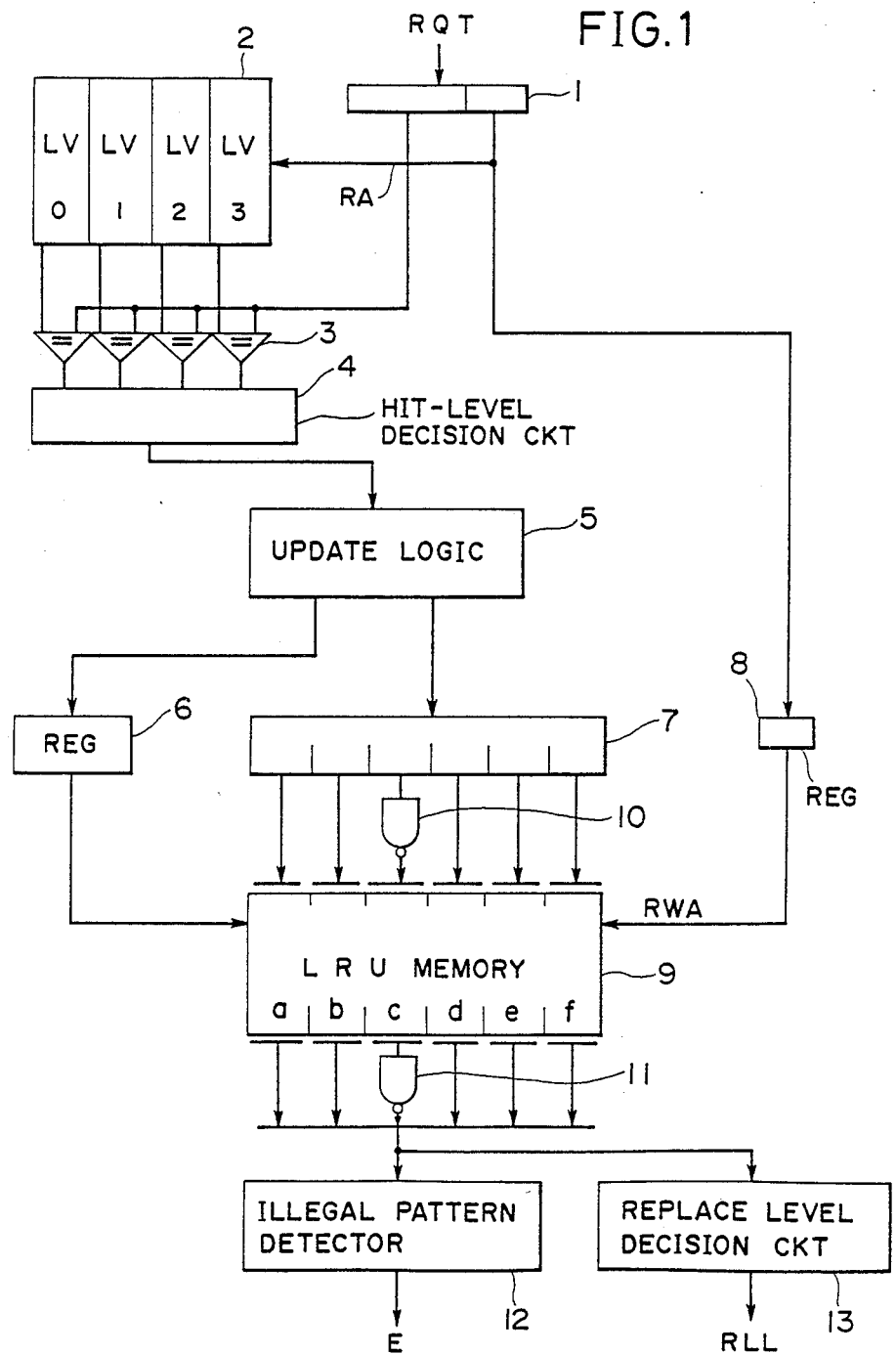
FIG. 1 is a block diagram of a fault detection circuit for an LRU memory according to an embodiment of the present invention.

Referring to FIG. 1, there is shown a fault detection circuit for an LRU (Least Recently Used) memory according to the present invention. The fault detection circuit comprises a request address register 1 which accepts a request address input RQT from an external request source, not shown, and supplies a column-read address RA to an address memory array 2 having four memory areas, or address levels 0, 1, 2 and 3 for storing valid or invalid indications of buffer memory contents. Comparators 3 are provided for comparing the outputs of the address memory array and the higher significant bit address data from the request address register 1 (corresponding to a block address) to produce a "hit" signal when a match occurs in the comparator. The outputs of the comparators 3 are fed to a hit-level detection circuit 4 which supplies an output signal to LRU update logic 5 when the level of hit exceeds a predetermined value as will be described.

On receiving an input from the decision circuit 4, the LRU update logic 5 proceeds to generate update bits and update data which will be applied to an LRU memory 9. The update bits indicate which bit or bits in the LRU memory 9 are to be updated and applied to an LRU bit write register 6. The output of register 6 is applied to the memory 9 to update its stored bits. The update data from the update logic 5 is applied to an LRU data write register 7 and fed to the LRU memory 9.

The LRU memory 9 is initialized by a circuit, not shown, with a string of bits "001000". A NAND gate 10, which acts as an inverter, has an input connected to the third bit position of register 7 from its MSB position and an output connected to the third bit position of LRU memory 9 from its MSB position. Therefore, the data stored in the LRU write data register 7 are all binary zero's. The column-read address RA from the request address register 1 is also applied to an LRU read/write address register 8 and thence to the LRU memory 9 as a read/write address RWA.

In the illustrated embodiment, the LRU memory 9 is of a 6-bit configuration having no error detection bits. The bit in the binary position "c", or third higher significant bit position of the memory 9 is inverted at the input by the NAND gate 10 and at the output by a second NAND gate 11.

The data stored in the bit positions "a", "b", "d", "e" and "f" of LRU memory 9 are combined with the output of NAND gate 11 at the input of an illegal pattern detector 12. Detector 12 functions to detect an error when the combined outputs have an illegal pattern and generate an error signal E. The same combined outputs appear at the input of a replace level decision circuit 13 to effect the determination of whether the level of data is to be replaced and generate an output RLL.

Figure 2:
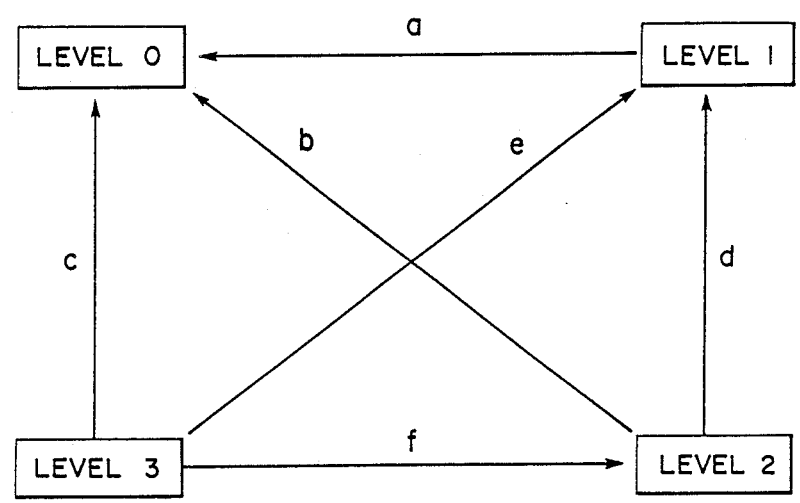
FIG. 2 is an illustration of the relationship between the data stored in the LRU memory of FIG. 1 and associated address levels.

The operation of the fault detection circuit of the invention will be given below with reference to FIG. 2 in which the relationships between the binary levels of the bit positions "a" through "f" of memory 9 and their most recent reference timings, or levels, are shown. In FIG. 2, it is shown that the bit position "a" is reference at level 1 more recently than it is referenced at level 0. In this instance, a binary "1" is stored into the bit position "a". When a binary "0" is stored into the position "a", the direction of arrow "a" in FIG. 2 is reversed to indicate that it is reference at level 0 more recently than at level 1. The same applies to the other bit positions of the LRU memory 9. The LRU memory 9 is updated whenever it is accessed so that the registered address level is updated to indicate that it is the most recent level.

Table 1 below shows the binary levels of data in the LRU memory 9 when it is sequentially updated at address levels 0 to 3 as indicated in FIG. 2. In Table 1, data not updated are left blank.

Data replace occurs on the basis of an algorithm which is inverse to that of the algorithm with which the data is updated as described above. Specifically, the data stored in the LRU memory 9 are replaced in a manner as shown in Table 2.

TABLE 1

| Address Levels | LRU Bits | | | | | |
|---|---|---|---|---|---|---|
| | a | b | c | d | e | f |
| 0 | 0 | 0 | 0 | | | |
| 1 | 1 | | | 0 | 0 | |
| 2 | | 1 | | 1 | | 0 |
| 3 | | | 1 | | 1 | 1 |

The blanks in Table 2 are binary levels which are ignored. For example, since at a level 0, the bit positions "a", "b" and "c" are written with binary one's and bit positions "d", "e" and "f" are left blank, level 0 is valid for replacement. There exist no valid data patterns other than those shown in Table 2, and so any other data patterns are treated as being illegal and the LRU memory 9 is identified as being faulty.

The fault detection circuit of the present invention is characterized by the inversion of one of the data inputs to the LRU memory, i.e., the input bit to the "c" position and a subsequent inversion of the output data bit from that position. Therefore, the logic algorithm of the invention takes into account such data bit inversions. Burst error is one which causes the LRU memory to be loaded with a string of all zero's or all one's. Without the bit inversion processes, such error

TABLE 2

| Replace Levels | LRU Bits | | | | | |
|---|---|---|---|---|---|---|
| | a | b | c | d | e | f |
| 0 | 1 | 1 | 1 | | | |
| 1 | 0 | | | 1 | 1 | |
| 2 | | 0 | | 0 | | 1 |
| 3 | | | 0 | | 0 | 0 | patterns cannot be detected as being in error since they are not illegal according to the algorithm of Table 2. However, the output inversion process on the position "c" data bit causes such patterns to be converted into a string of "001000" or "110111" which can be detected as being illegal. On the other hand, the combined input and output inversion processes on the position "c" data bit allow error-free data bits to be applied unaffected to the illegal pattern detector 12 and replace level decision circuit 13. Therefore, any kind of burst error can be detected without altering or adding extra hardware.

What is claimed is:

1. A fault detection circuit for a buffer memory having a plurality of address levels comprising:

an LRU memory having a series of bit storage cells for storing a series of bits therein, said stored bits indicating relationships between most recently referenced timings for each of said address levels;

means for generating updating input data bits in response to said LRU memory being accessed from an external source and applying the generated updating input data bits to said LRU memory to cause same to generate updated output data bits;

means for inverting one of said updating input data bits prior to application to said LRU memory;

an error detection circuit responsive to said updated output data bits for detecting an error therein; and means for inverting one of said updated output data bits prior to application to said error detection circuit corresponding in binary significant position to said inverted updating input data bit.

2. A fault detection circuit for a buffer memory having a plurality of address levels, comprising:

a request address register for receiving a request from an external source and generating higher significant bits and lower significant bits;

an address memory having a plurality of cells for storing said lower significant bits from said request address register for defining address levels;

a plurality of comparators for detecting a match between each of the contents of said cells and each of said higher significant bits from said request address register and generating a coincidence output from each of said comparator in response to the detection of a match by each of said comparators;

a decision circuit for generating an output when the number of said coincidence outputs exceeds a predetermined value;

an LRU memory having a series of bit storage cells for storing a series of bits therein, said stored bits indicating relationships between most recently referenced timings for each of said address levels;

an updating logic for deriving updating input data bits from the output of said decision circuit in response to said LRU memory being accessed from an external source and applying the generated updating input data bits to said LRU memory to cause same to generate updated output data bits;

means for inverting one of said updating input data bits prior to application to said LRU memory;

an error detection circuit responsive to said updated output data bits for detecting an error therein; and means for inverting one of said updated output data bits prior to application to said error detection circuit corresponding to binary significant position to said inverted updating input data bit

* * * * *